W. COX.
Thill-Coupling.
No 15,169
Patented June 24, 1856.
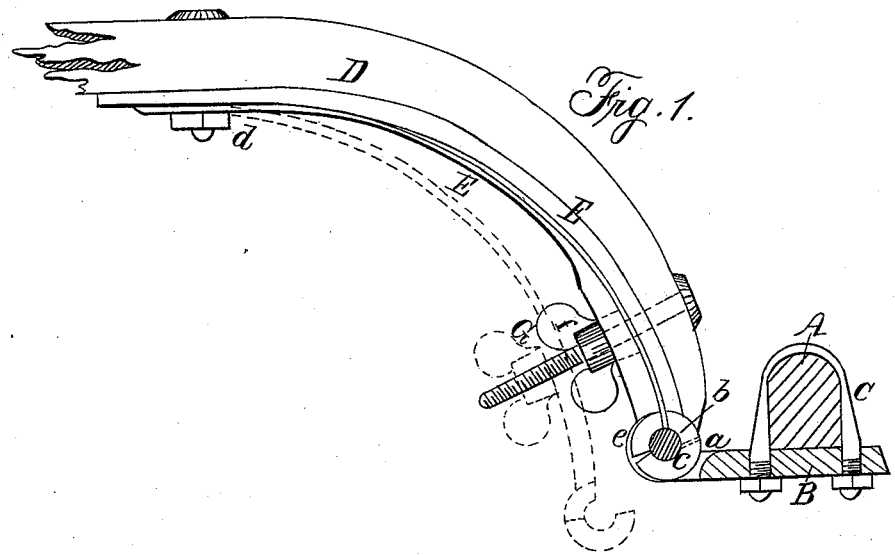
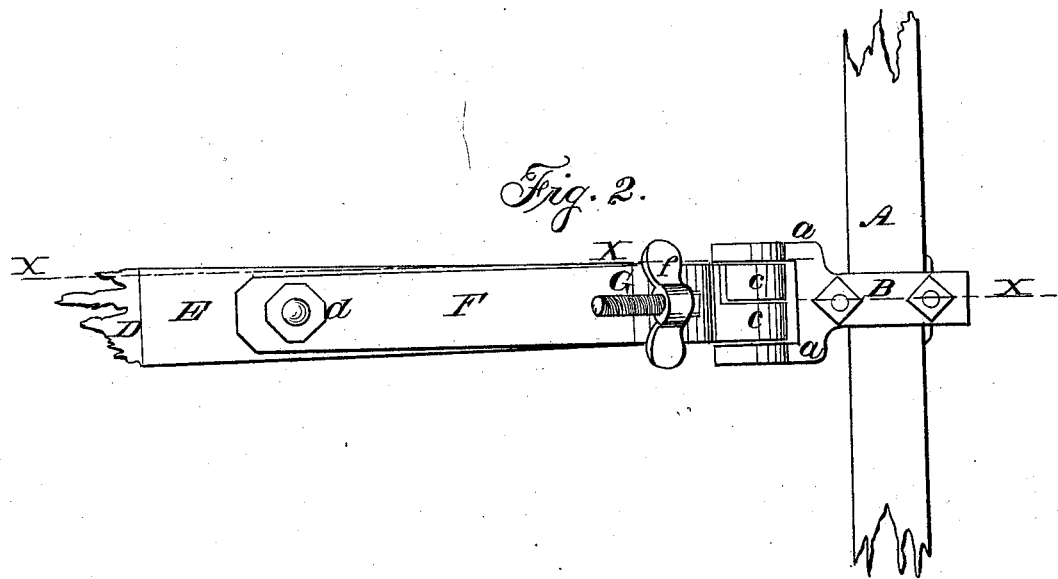

UNITED STATES PATENT OFFICE.

WM. COX, OF DOYLESTOWN, PENNSYLVANIA.

MODE OF SECURING SHAFTS TO AXLES.

Specification of Letters Patent No. 15,169, dated June 24, 1856.

*To all whom it may concern:*

Be it known that I, WILLIAM COX, of Doylestown, in the county of Bucks and State of Pennsylvania, have invented a new and Improved Mode of Attaching the Thills or Shafts of Vehicles to the Front Axles; and I do hereby declare that the following is a full, clear, and exact description of the same, reference being had to the annexed drawings, making a part of this specification, in which—

Figure 1, is a section of my improvement, (*x*), (*x*), Fig. 2, showing the plane of section. Fig. 2, is an inverted plan of the same.

Similar letters of reference indicate corresponding parts in the two figures.

My invention consists in having rods secured between arms, which are attached to the front axle, by the usual clips, and having two jaws secured to the end of each shaft or thill, one jaw of each pair being stationary, and the other movable or adjustable, and operated by a screw and nut, so that the jaws may be secured on the rods, or removed or detached therefrom with the greatest facility.

To enable those skilled in the art to fully understand and construct my invention, I will proceed to describe it.

A, represents the front axle of a carriage or vehicle, and B, represents a forked bar, or two arms, (*a*), (*a*), attached to a bar B, which bar is secured to the axle A, by a clip C, of usual construction. Between the two arms, (*a*), (*a*), there is permanently secured a rod, (*b*), shown bisected in Fig. 1, and by dotted lines in Fig. 2.

D, represents the inner end of one of the shafts or thills of a vehicle, and E, is a metallic bar which is permanently secured to the end of the shaft D. The outer end of the bar E, is curved or bent in semi-circular form, so as to form a jaw, (*c*), to fit over the upper part of the rod, (*b*).

F, represents an elastic bar, the inner end of which is attached by a bolt, (*d*), to the shaft D. The outer end of the bar F, has a jaw, (*e*), formed on it, corresponding in form to the jaw, (*c*), on the bar E. The two jaws, (*c*), (*e*), do not extend the whole width of the bars E, F, a portion of them is cut away, so that the two jaws may fit together, side by side, when the bar F, is pressed up against the bar E, the two jaws when brought together forming a cylinder, with a circular opening through its center.

G, represents a screw bolt, which passes through the shaft D, and the two bars E, F, said bolt having a thumb nut, (*f*), on its lower end.

From the above description it will be readily seen, that by turning the thumb nut, (*f*), the two jaws, (*c*), (*e*), may be secured over or around the rod, (*b*), and by unscrewing the thumb nut, (*f*), the elastic plate F, will spring down and separate the jaw (*e*) from the jaw (*c*), as shown in red Fig. 1, so that the shaft may be detached from the rod (*b*).

The jaws (*c*), (*e*) may be secured as tightly around the rod (*b*), as desired, so that they will fit snugly thereon, and all play or looseness avoided, and the jaws and rod may be case hardened in order to prevent wear.

The device may be applied to tongues, as well as to shafts or thills.

Having thus described my invention, what I claim as new and desire to secure by Letters Patent, is—

The two bars E, F, with the jaws, (*c*), (*e*), attached to them, the bar F, being elastic, and having a screw G, passing through it, on which a nut (*f*), is fitted, the bars E, F, being attached to the shafts D, and the rods (*b*), around which the jaws are fitted, being attached to the axle A, substantially as described, for the purpose specified.

WILLIAM COX.

Witnesses:
JAMES M. DIVINE,
JAMES GILKYSON.